(12) United States Patent
Chen

(10) Patent No.: US 11,624,975 B2
(45) Date of Patent: Apr. 11, 2023

(54) WAVELENGTH CONVERSION MODULE AND PROJECTION DEVICE

(71) Applicant: Coretronic Corporation, Hsin-Chu (TW)

(72) Inventor: I-Hua Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/870,851

(22) Filed: Jul. 22, 2022

(65) Prior Publication Data

US 2023/0022801 A1   Jan. 26, 2023

(30) Foreign Application Priority Data

Jul. 26, 2021   (CN) .......................... 202121697349.7

(51) Int. Cl.
   *G03B 21/20*   (2006.01)
   *G02B 26/00*   (2006.01)

(52) U.S. Cl.
   CPC .......... *G03B 21/204* (2013.01); *G02B 26/008* (2013.01)

(58) Field of Classification Search
   CPC .... G03B 21/204; G03B 21/16; G02B 26/008; G02B 26/08; F21V 9/45
   See application file for complete search history.

(56) References Cited

U.S. PATENT DOCUMENTS

| | | | | |
|---|---|---|---|---|
| 10,156,729 | B2 * | 12/2018 | Chang | G02B 27/141 |
| 2016/0069535 | A1 * | 3/2016 | Liu | G03B 33/08 362/360 |
| 2021/0373423 | A1 * | 12/2021 | Hsu | G03B 21/204 |

FOREIGN PATENT DOCUMENTS

| | | | | |
|---|---|---|---|---|
| CN | 109654391 | | 9/2020 | |
| CN | 109838703 | | 12/2020 | |
| CN | 114488673 A | * | 5/2022 | .......... H01L 33/502 |
| TW | 201514425 | | 4/2015 | |
| TW | I540377 B | * | 7/2016 | |
| TW | I584043 | | 5/2017 | |

OTHER PUBLICATIONS

TWI540377B, Chen et al., Optical Wavelength Converter and Illumination System Using the Same (Year: 2016).*
CN-114488673-A, Chen et al., Wavelength Conversion Element (Year: 2022).*

\* cited by examiner

*Primary Examiner* — Jong-Suk (James) Lee
*Assistant Examiner* — Glenn Zimmerman
(74) *Attorney, Agent, or Firm* — JCIPRNET

(57) ABSTRACT

A wavelength conversion module, including a first substrate, a second substrate, a counterweight ring, a first wavelength conversion layer, and a second wavelength conversion layer, is provided. The first substrate has a first upper surface. The second substrate has a second upper surface. The counterweight ring is disposed on the first upper surface of the first substrate and the second upper surface of the second substrate to connect the first substrate to the second substrate. The first wavelength conversion layer is disposed on the first upper surface of the first substrate and located around the counterweight ring. The second wavelength conversion layer is disposed on the second upper surface of the second substrate and located around the counterweight ring. A wavelength of a first excited beam emitted by the first wavelength conversion layer is greater than a wavelength of a second excited beam emitted by the second wavelength conversion layer.

18 Claims, 16 Drawing Sheets

WAVELENGTH CONVERSION MODULE AND PROJECTION DEVICE

CROSS-REFERENCE TO RELATED APPLICATION

This application claims the priority benefit of China application serial no. 202121697349.7, filed on Jul. 26, 2021. The entirety of the above-mentioned patent application is hereby incorporated by reference herein and made a part of this specification.

BACKGROUND

Technical Field

This disclosure relates to an optical module and a projection device, and in particular to a wavelength conversion module and a projection device with the wavelength conversion module.

Description of Related Art

A wavelength conversion module (fluorescent color wheel) is a source of brightness of a laser projection device. The wavelength conversion module has to possess characteristics of high luminous efficiency, high heat resistance, and ability to withstand high-energy laser power. In general, a wavelength conversion layer of the wavelength conversion module is affected by thermal characteristics, therefore the higher the temperature of the wavelength conversion layer, the lower the luminous efficiency. Thus, for a high-power laser projection device, a more heat-resistant wavelength conversion layer and a heat dissipation substrate with faster heat dissipation are required.

Currently, aluminum or aluminum alloy is mainly used as the material of the heat dissipation substrate, and has characteristics of high thermal conductivity (230 W/mK), low density (2.7 g/cm$^3$), low cost, and easy processing. However, the aluminum and aluminum alloy are not high heat resistant, so they cannot be used in high-temperature manufacturing processes that are above 300° C. Furthermore, the current heat dissipation substrate of the wavelength conversion module uses only a single material. Although the manufacturing process is relatively simple, it has severe limitations and cannot meet the requirements such as high heat resistance, high thermal conductivity, and high brightness concurrently. Therefore, in order to address the above-mentioned issues, there is currently a wavelength conversion module in which a metal substrate with a wavelength conversion layer and a ceramic substrate with a wavelength conversion layer are attached to the same metal base plate. However, the above-mentioned wavelength conversion module has five layers from top to bottom, namely the wavelength conversion layer, a diffuse reflection layer, the ceramic substrate, an adhesive, and the metal base plate. The more layers there are in the wavelength conversion module, the greater the thermal resistance and the lower the heat dissipation efficiency, and the heavier the weight of the wavelength conversion module, the greater the burden on the motor, which easily affects the lifespan of the motor.

The information disclosed in this background section is only for enhancement of understanding of the background of the described technology and therefore it may contain information that does not form the prior art that is already known to a person of ordinary skill in the art. Furthermore, the information disclosed in this section does not mean that one or more problems to be resolved by one or more embodiments of the disclosure were acknowledged by a person of ordinary skill in the art.

SUMMARY

This disclosure provides a wavelength conversion module, which has better heat dissipation capability.

The disclosure further provides a projection device, which includes the above-mentioned wavelength conversion module, and has good projection quality and product competitiveness.

An embodiment of the disclosure provides a wavelength conversion module, which includes a first substrate, a second substrate, a counterweight ring, a first wavelength conversion layer, and a second wavelength conversion layer. The first substrate has a first upper surface. The second substrate has a second upper surface. The counterweight ring is disposed on the first upper surface of the first substrate and the second upper surface of the second substrate, so as to connect the first substrate to the second substrate. The first wavelength conversion layer is disposed on the first upper surface of the first substrate and located around the counterweight ring. The second wavelength conversion layer is disposed on the second upper surface of the second substrate and located around the counterweight ring. A wavelength of a first excited beam emitted by the first wavelength conversion layer is greater than a wavelength of a second excited beam emitted by the second wavelength conversion layer. The first excited beam does not penetrate the first substrate, and the second excited beam does not penetrate the second substrate. Thermal conductivity of the first substrate and thermal conductivity of the second substrate are both greater than 100 W/mK, and the thermal conductivity of the first substrate is greater than the thermal conductivity of the second substrate.

An embodiment of the disclosure provides a projection device, which includes an illumination module, a light valve, and a projection lens. The illumination module is configured to provide an illumination beam. The illumination module includes a light source and a wavelength conversion module. The light source is configured to provide an excitation beam. The wavelength conversion module is disposed on a transmission path of the excitation beam, and is configured to convert the excitation beam into a converted beam. The illumination beam includes a converted beam, and the wavelength conversion module includes a first substrate, a second substrate, a counterweight ring, a first wavelength conversion layer, and a second wavelength conversion layer. The first substrate has a first upper surface. The second substrate has a second upper surface. The counterweight ring is disposed on the first upper surface of the first substrate and the second upper surface of the second substrate, so as to connect the first substrate to the second substrate. The first wavelength conversion layer is disposed on the first upper surface of the first substrate and located around the counterweight ring. The second wavelength conversion layer is disposed on the second upper surface of the second substrate and located around the counterweight ring. A wavelength of a first excited beam emitted by the first wavelength conversion layer is greater than a wavelength of a second excited beam emitted by the second wavelength conversion layer. The first excited beam does not penetrate the first substrate, and the second excited beam does not penetrate the second substrate. The first excited beam and the second excited beam form the converted beam. Thermal conductivity of the first substrate and thermal conductivity of the second substrate are both greater than 100 W/mK, and the thermal conductivity of the first substrate is greater than the thermal conductivity of the second substrate. The light valve is disposed on a transmission path of the illumination beam, and is configured to convert the illumination beam into an image beam. The projection lens is disposed on a transmission path of the image beam, and is configured to project the image beam out of the projection device.

Based on the above, the embodiments of the disclosure have at least one of the following advantages. In the design of the wavelength conversion module of the disclosure, the first substrate and the second substrate are connected to each other by the counterweight ring. The thermal conductivity of the first substrate and the thermal conductivity of the second substrate are both greater than 100 W/mK, and the thermal conductivity of the first substrate is greater than the thermal conductivity of the second substrate. Compared with the related art, the wavelength conversion module of the disclosure does not has to be fixed through a metal bottom plate, which can effectively reduce the number of layers and weight, thereby having the advantages of good heat dissipation, light weight, simple manufacturing process, and low cost.

Other objectives, features and advantages of the disclosure can be further understood from the further technological features disclosed by the embodiments of the disclosure wherein there are shown and described preferred embodiments of the disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the descriptions, serve to explain the principles of the disclosure.

DESCRIPTION OF THE EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top", "bottom", "front", "back" etc., is used with reference to the orientation of the figure(s) being described. The components of the disclosure can be positioned in a number of different orientations. As such, the directional terminology is used for purposes of illustration and is in no way limiting. On the other hand, the drawings are only schematic and the size of the components may be exaggerated for clarity. It is to be understood that other embodiments may be utilized and structural changes may be made without departing from the scope of the disclosure. Also, it is to be understood that the phraseology and terminology used herein are for the purpose of description and should not be regarded as limiting. The usage of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces" and variations thereof herein are used broadly and encompass direct and indirect facing, and "adjacent to" and variations thereof herein are used broadly and encompass directly and indirectly "adjacent to". Therefore, the description of "A" assembly facing "B" assembly herein may contain the situations that "A" assembly directly faces "B" assembly or one or more additional components are between "A" assembly and "B" assembly. Also, the description of "A" assembly "adjacent to" "B" assembly herein may contain the situations that "A" assembly is directly "adjacent to" "B" assembly or one or more additional components are between "A" assembly and "B" assembly. Accordingly, the drawings and descriptions will be regarded as illustrative in nature and not as restrictive.

Figure 1:
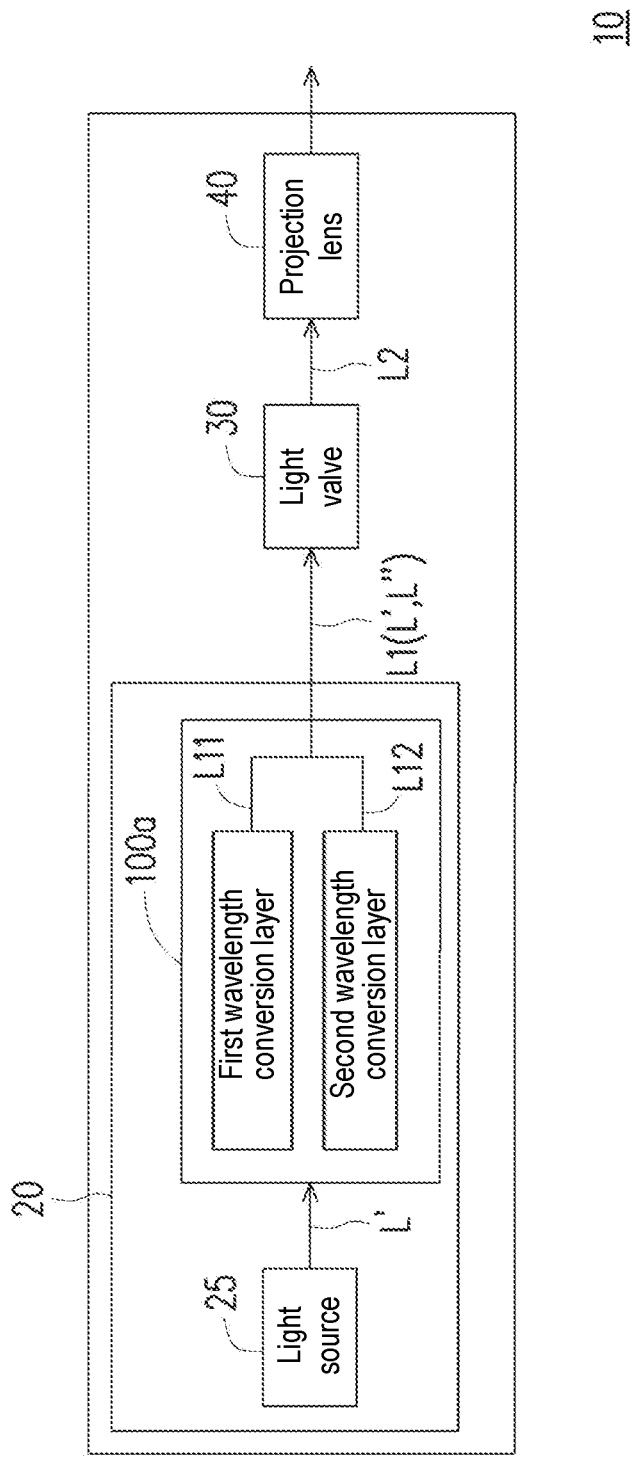
FIG. 1 is a schematic view of a projection device according to an embodiment of the disclosure.

FIG. 1 is a schematic view of a projection device according to an embodiment of the disclosure. With reference to FIG. 1 first, in the embodiment, a projection device 10 includes an illumination module 20, a light valve 30, and a projection lens 40. The illumination module 20 is configured to provide an illumination beam L1, and the illumination module 20 includes a light source 25 and a wavelength conversion module 100a. The light source 25 is configured to provide an excitation beam L', and the wavelength conversion module 100a receives the excitation beam L' and is disposed on a transmission path of the excitation beam L'. The wavelength conversion module 100a is configured to convert a wavelength of the excitation beam L', so as to generate a converted beam L" that has a different wavelength. Here, the illumination beam L1 including at least one of the excitation beam L' and the converted beam L" is emitted by the wavelength conversion module 100a. In the embodiment, the excitation beam L' is, for example, a blue beam, and the converted beam L" is, for example, a yellow beam and/or a red beam and a green beam. The light valve 30 is disposed on a transmission path of the illumination beam L1 and is configured to convert the illumination beam L1 into an image beam L2. The projection lens 40 is disposed on a transmission path of the image beam L2 and is configured to project the image beam L2 out of the projection device 10.

In detail, the light source 25 used in the embodiment is, for example, a laser diode (LD), such as a laser diode bank. Specifically, any light source that meets the volume requirement in actual design may be implemented, but the disclosure is not limited thereto. The light valve 30 is, for example, a reflective light modulator such as a liquid crystal on silicon panel (LCoS panel) and a digital micro-mirror device (DMD). In an embodiment, the light valve 30 is, for example, a transmissive optical modulator such as a transparent liquid crystal panel, an electro-optic modulator, a magneto-optical modulator, and an acousto-optic modulator (AOM), but the embodiment does not limit the form and type of the light valve 30. Sufficient teachings, suggestions, and implementation descriptions of detailed steps and implementation of a method of converting the illumination beam L1 into the image beam L2 by the light valve 30 may be obtained from general knowledge in the technical field, and are not repeated here. In addition, the projection lens 40 includes, for example, a combination of one or more optical lenses having refractive power, such as various combinations of non-planar lenses such as a biconcave lens, a biconvex lens, a meniscus lens, a convex-concave lens, a plano-convex lens, and a plano-concave lens. In an embodiment, the projection lens 40 may further include a flat optical lens, so as to convert the image beam L2 coming from the light valve 30 into a projection beam in a reflective or penetration manner, and projects the projection beam out of the projection device 10. Herein, the embodiment does not limit the form and type of the projection lens 40.

Figure 2A:
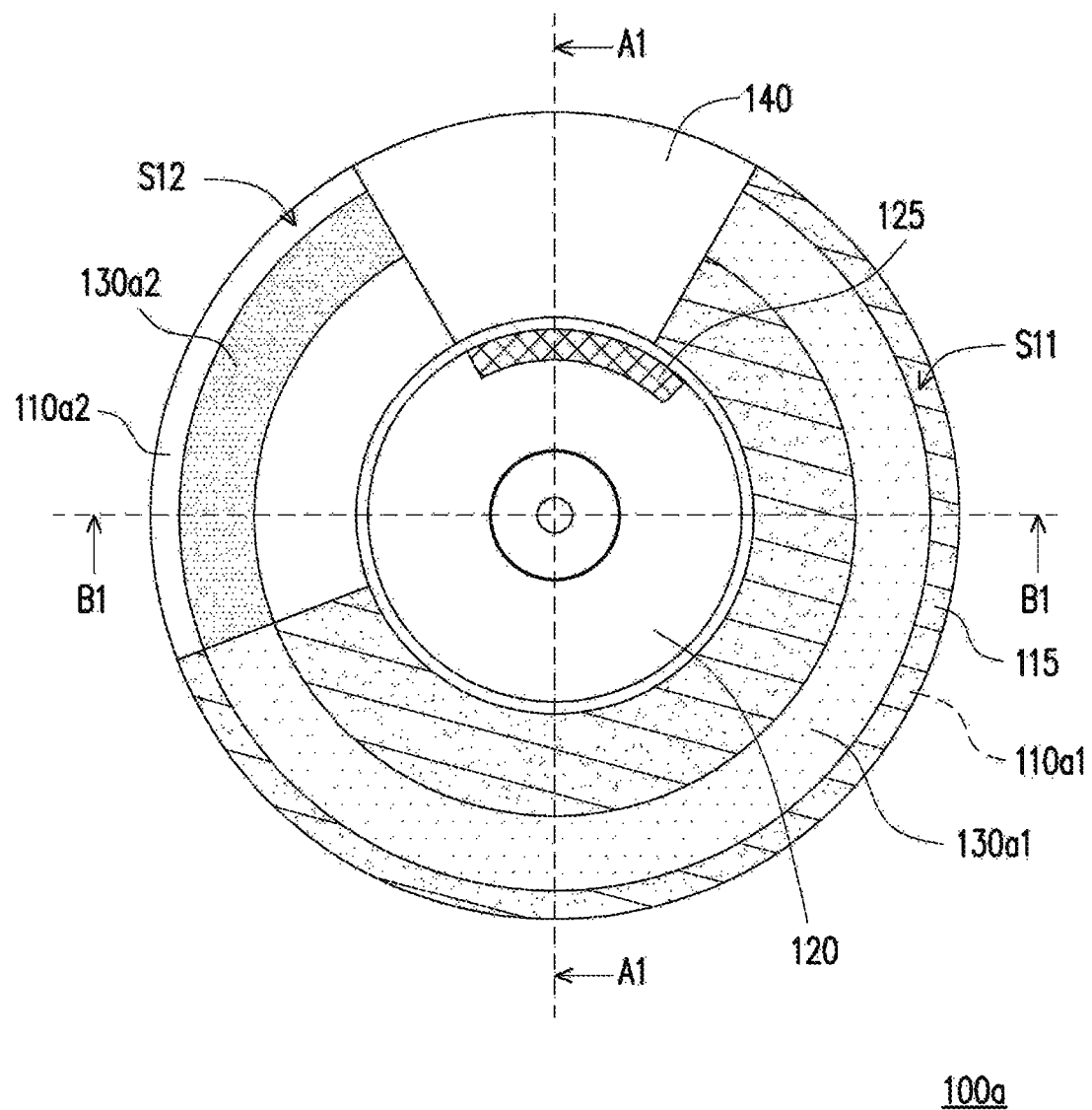
FIG. 2A is a schematic top view of the wavelength conversion module of the projection device in FIG. 1.
Figure 2B:
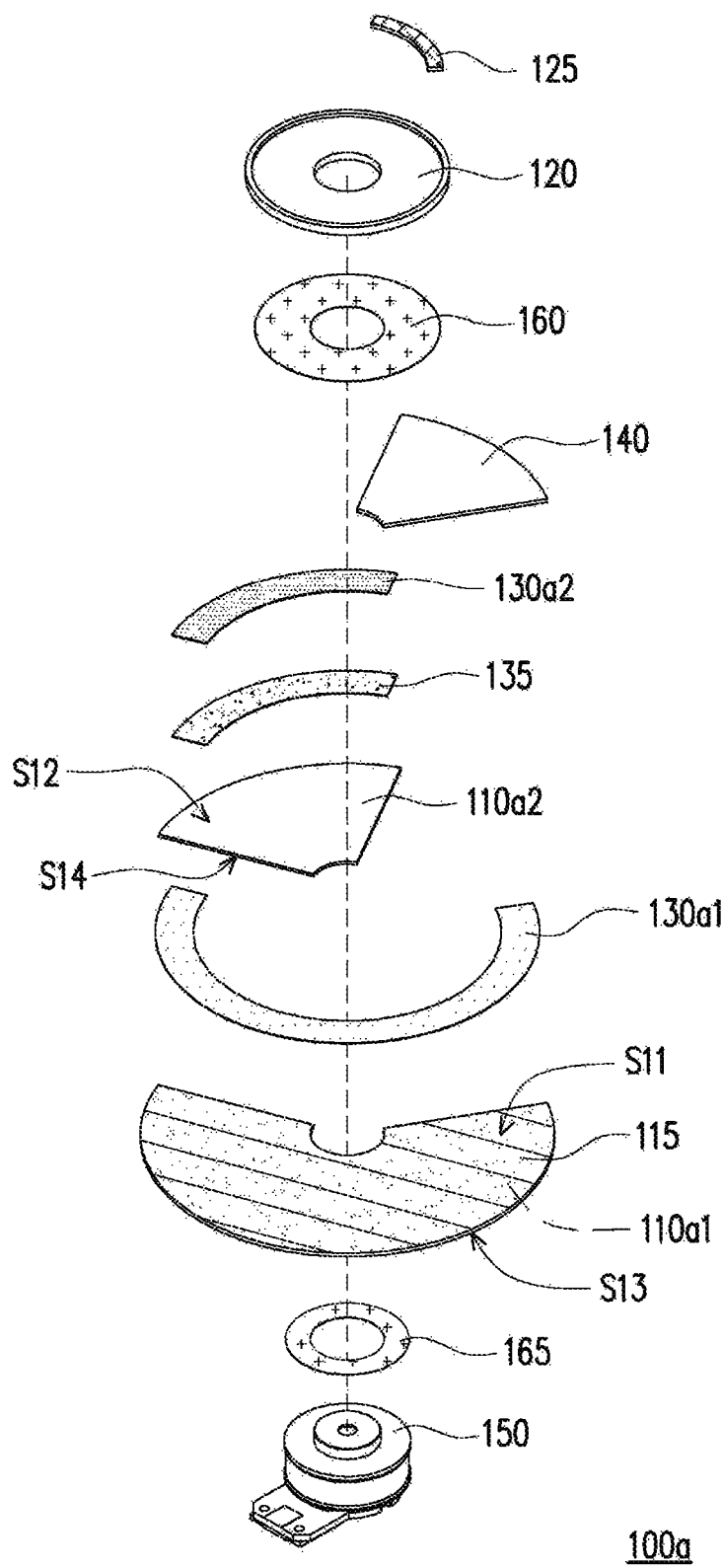
FIG. 2B is a three-dimensional exploded schematic view of the wavelength conversion module in FIG. 2A.
Figure 2C:
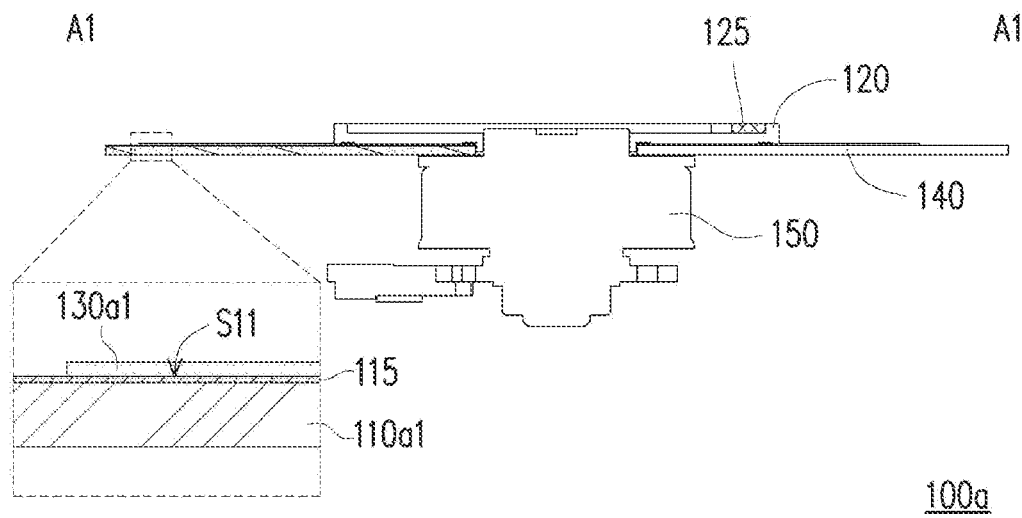
FIG. 2C is a schematic cross-sectional view along an axis A1-A1 in FIG. 2A.
Figure 2D:
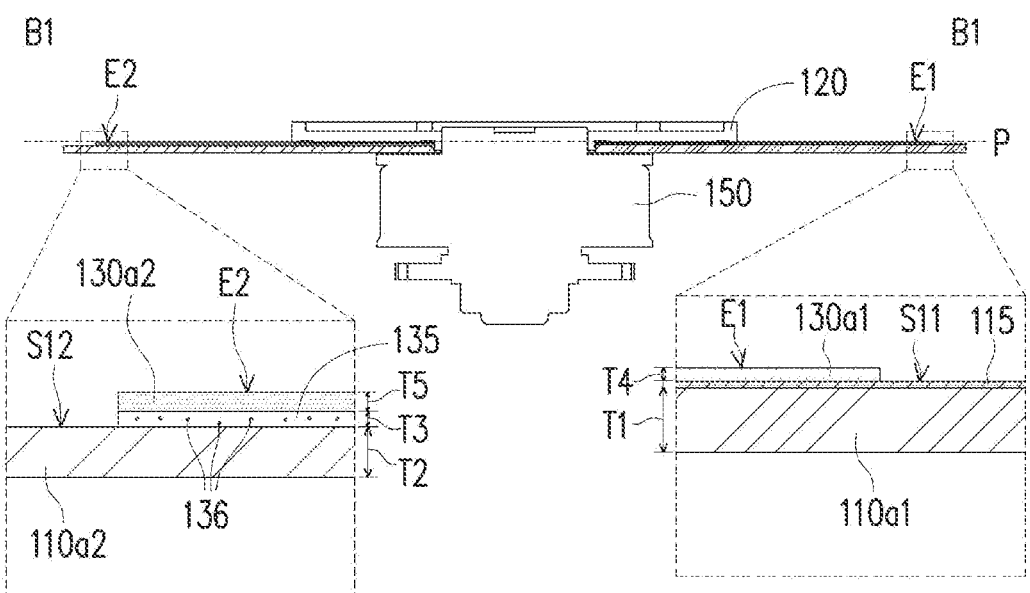
FIG. 2D is a schematic cross-sectional view along an axis B1-B1 in FIG. 2A.

FIG. 2A is a schematic top view of a wavelength conversion module of the projection device in FIG. 1. FIG. 2B is a three-dimensional exploded schematic view of the wavelength conversion module in FIG. 2A. FIG. 2C is a schematic cross-sectional view along an axis A1-A1 in FIG. 2A. FIG. 2D is a schematic cross-sectional view along an axis B1-B1 in FIG. 2A.

With reference to FIG. 2A, in the embodiment, the wavelength conversion module 100a includes a first substrate 110a1, a second substrate 110a2, a counterweight ring 120, a first wavelength conversion layer 130a1, and a second wavelength conversion layer 130a2. In detail, with reference to FIGS. 2A and 2B concurrently, the first substrate 110a1 has a first upper surface S11, and the second substrate 110a2 has a second upper surface S12. The counterweight ring 120 is disposed on the first upper surface S11 of the first substrate 110a1 and the second upper surface S12 of the second substrate 110a2, so as to connect the first substrate 110a1 to the second substrate 110a2. That is, the first substrate 110a1 and the second substrate 110a2 are joined by the counterweight ring 120. The first wavelength conversion layer 130a1 is disposed on the first upper surface S11 of the first substrate 110a1, and is located around the counterweight ring 120. The second wavelength conversion layer 130a2 is disposed on the second upper surface S12 of the second substrate 110a2, and is located around the counterweight ring 120. In particular, a wavelength of a first excited beam L11 (with reference to FIG. 1) emitted by the first wavelength conversion layer 130a1 is greater than a wavelength of a second excited beam L12 (with reference to FIG. 1) emitted by the second wavelength conversion layer 130a2. Here, a center wavelength of the first excited beam L11 is, for example, between 541 nanometers (nm) and 620 nanometers (nm), and a center wavelength of the second excited beam L12 is, for example, between 500 nanometers (nm) and 540 nanometers. (nm). The first excited beam L11 does not penetrate the first substrate 110a1, and the second excited beam L12 does not penetrate the second substrate 110a2. The first excited beam L11 and the second excited beam L12 form the converted beam L" (with reference to FIG. 1).

Furthermore, with reference to FIGS. 2B, 2C, and 2D concurrently, in the embodiment, thermal conductivity of the first substrate 110a1 and thermal conductivity of the second substrate 110a2 are both greater than 100 W/mK, while the thermal conductivity of the first substrate 110a1 is greater than the thermal conductivity of the second substrate 110a2. Preferably, the first substrate 110a1 is, for example, a metal substrate, and the second substrate 110a2 is, for example, a ceramic substrate. Since the long-wavelength first wavelength conversion layer 130a1 is susceptible to temperature rise as a result of its material (such as phosphor particles mixed with an alcohol-soluble inorganic adhesive or an aqueous inorganic adhesive), the brightness of the converted beam L" (with reference to FIG. 1) is affected, and there is a coating layer 115 plated on the first substrate 110a1 that is disposed on the first wavelength conversion layer 130a1. The coating layer 115 is, for example, a silver-plated reflection layer, an aluminum-plated reflection layer, or a dielectric-plated reflection layer, but is not limited thereto, so as to increase heat dissipation speed. Furthermore, a thickness T1 of the first substrate 110a1 is greater than a thickness T2 of the second substrate 110a2, and an area of the first substrate 110a1 is greater than an area of the second substrate 110a2. A thickness T4 of the first wavelength conversion layer 130a1 and a thickness T5 of the second wavelength conversion layer 130a2 are between 0.08 millimeters (mm) to 0.30 mm. The thickness T4 of the first wavelength conversion layer 130a1 is, for example, 0.14 mm, and the thickness T5 of the second wavelength conversion layer 130a2 is, for example, 0.19 mm, but is not limited thereto.

With reference to FIGS. 2A and 2B again, the wavelength conversion module 100a further includes a light-transmitting plate 140, which is joined with the first substrate 110a1 and the second substrate 110a2 to form a circular turntable, and is connected to the first substrate 110a1 and the second substrate 110a2 through the counterweight ring 120. Here, the light-transmitting plate 140 is any light-transmissive plate, such as a glass sheet, but is not limited thereto. In a sequence of rotation of the wavelength conversion module 100a, the excitation beam L' passes through the light-transmitting plate 140 when the light-transmitting plate 140 is located on the transmission path of the excitation beam L'. In order to maintain balance, the wavelength conversion module 100a of the embodiment further includes a calibration material 125 disposed within the counterweight ring 120. Furthermore, the wavelength conversion module 100a of the embodiment further includes a driving assembly 150. The first substrate 110a1 has a first lower surface S13 opposite to the first upper surface S11, and the second substrate has a second lower surface S14 opposite to the second upper surface S12. The driving assembly 150 is disposed on the first lower surface S13 of the first substrate 110a1 and the second lower surface S14 of the second substrate 110a2, so as to clamp the first substrate 110a1 to the second substrate 110a2 by the counterweight ring 120. In other words, the counterweight ring 120 clamps the first substrate 110a1 and the second substrate 110a2 together. Here, the driving assembly 150 is, for example, a motor, but is not limited thereto.

Furthermore, with reference FIG. 2B again, the wavelength conversion module 100a of the embodiment further includes a first adhesive layer 160 and a second adhesive layer 165. The first adhesive layer 160 is disposed between the counterweight ring 120 and the first substrate 110a1 and the second substrate 110a2. The counterweight ring 120 is fixed on the first upper surface S11 of the first substrate 110a1 and the second upper surface S12 of the second substrate 110a2 through the first adhesive layer 160. The second adhesive layer 165 is disposed between the driving assembly 150 and the first substrate 110a1 and the second substrate 110a2. The driving assembly 150 is fixed on the first lower surface S13 of the first substrate 110a1 and the second lower surface S14 of the second substrate 110a2 through the second adhesive layer 165.

In addition, with reference to FIGS. 2B and 2D, as the extent of impact of the short-wavelength second wavelength conversion layer 130a2 when it is heated on the decrease in the brightness of the converted beam L" (with reference to FIG. 1) is smaller, therefore the wavelength conversion module 100a of the embodiment further includes a diffuse reflection layer 135, which is disposed between the second surface S12 of the second substrate 110a2 and the second wavelength conversion layer 130a2. Here, the diffuse reflection layer 135 includes multiple white scattering particles 136, and the white scattering particles 136 are, for example, multiple titanium dioxide particles, multiple silica particles, multiple alumina particles, multiple boron nitride particles, or multiple zirconia particles, but are not limited thereto. Here, a thickness T3 of the diffuse reflection layer 135 is, for example, between 0.08 nanometers (nm) and 0.2 mm. In the manufacturing process, the white scattering particles 136 and glass powder may be sintered on the second substrate 110a2 to form the diffuse reflection layer 135, and then wavelength conversion particles and glass powder may be sintered to form the second wavelength conversion layer 130a2 on the diffuse reflection layer 135. Since the high temperature sintering process is used, the second wavelength conversion layer 130a2 is more heat resistant, and the reflection layer is the diffuse reflection layer 135, therefore the cost is lower. As shown in FIG. 2D, a first light-emitting surface E1 of the first wavelength conversion layer 130a1 and a second light-emitting surface E2 of the second wavelength conversion layer 130a2 are located on a same plane P.

In short, in the embodiment, the thinner long-wavelength first wavelength conversion layer 130a1 is disposed on the first substrate 110a1 that is plated with the coating layer 115, which may maintain the best brightness. On the other hand, the coating layer 115 is replaced by the diffuse reflection layer 135, and the thicker short-wavelength second wavelength conversion layer 130a2 is disposed on the second substrate 110a2 through the diffuse reflection layer 135, which may maintain the best brightness. Furthermore, the wavelength conversion module 100a of the embodiment may reduce an initial unbalance amount through the different materials and thicknesses of the first substrate 110a1 and the second substrate 110a2, which may reduce calibration man-hours and the usage of the calibration material 125, and may increase reliability of the wavelength conversion module 100a. In addition, the first substrate 110a1 and the second substrate 110a2 of the embodiment are connected together through the counterweight ring 120. Compared with the related art, the wavelength conversion module 100a of the embodiment does not require fixing by a metal bottom plate, which can effectively reduce the number of layers and weight, thereby having advantages of good heat dissipation, light weight, simple manufacturing process, and low cost.

It should be noted here that the following embodiments use the reference numerals and part of the content of the foregoing embodiments, in which the same reference numerals are used to represent the same or similar elements, and the description of the same technical content is omitted. Reference may be made to the foregoing embodiments for the description of the omitted content, which is not repeated in the following embodiments.

Figure 3A:
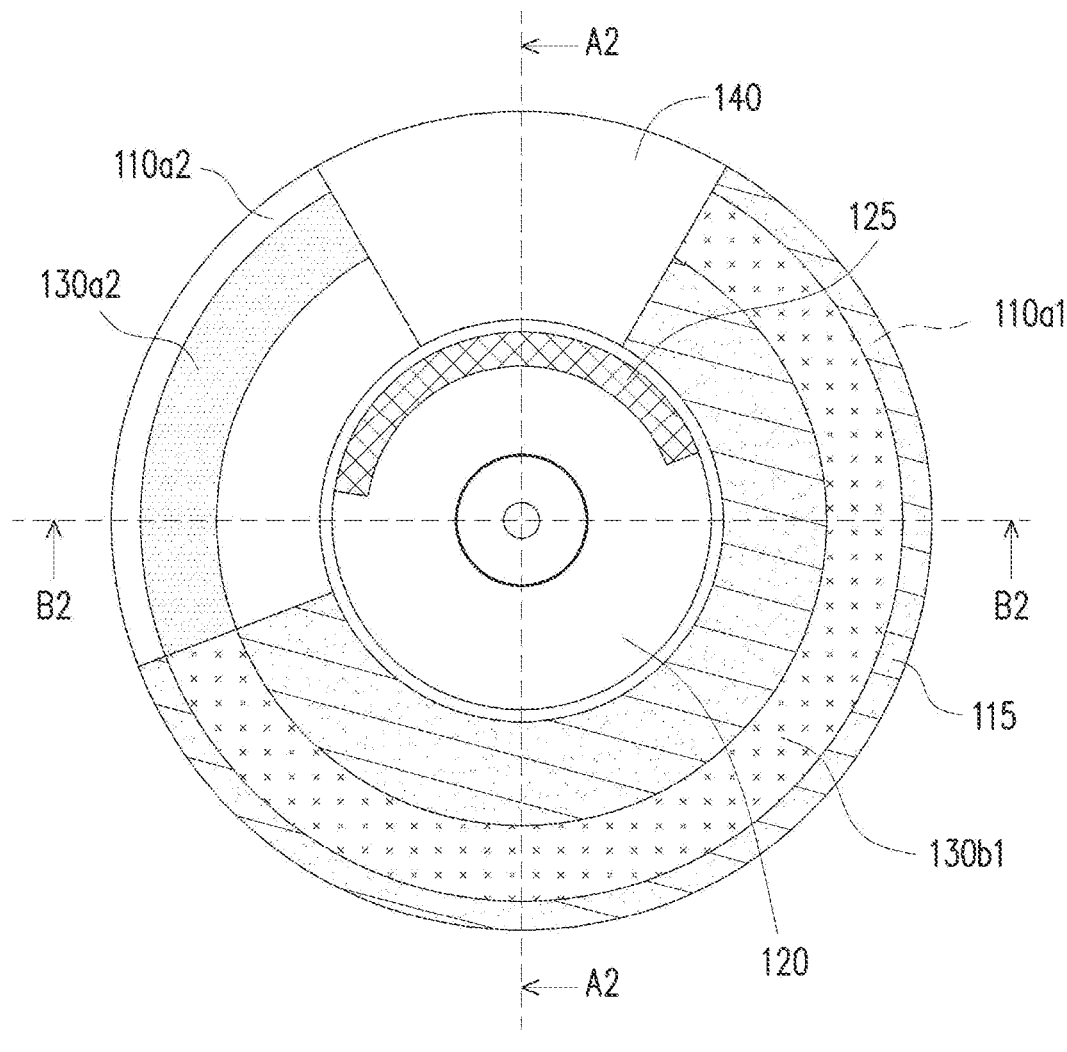
FIG. 3A is a schematic top view of a wavelength conversion module according to an embodiment of the disclosure.
Figure 3B:
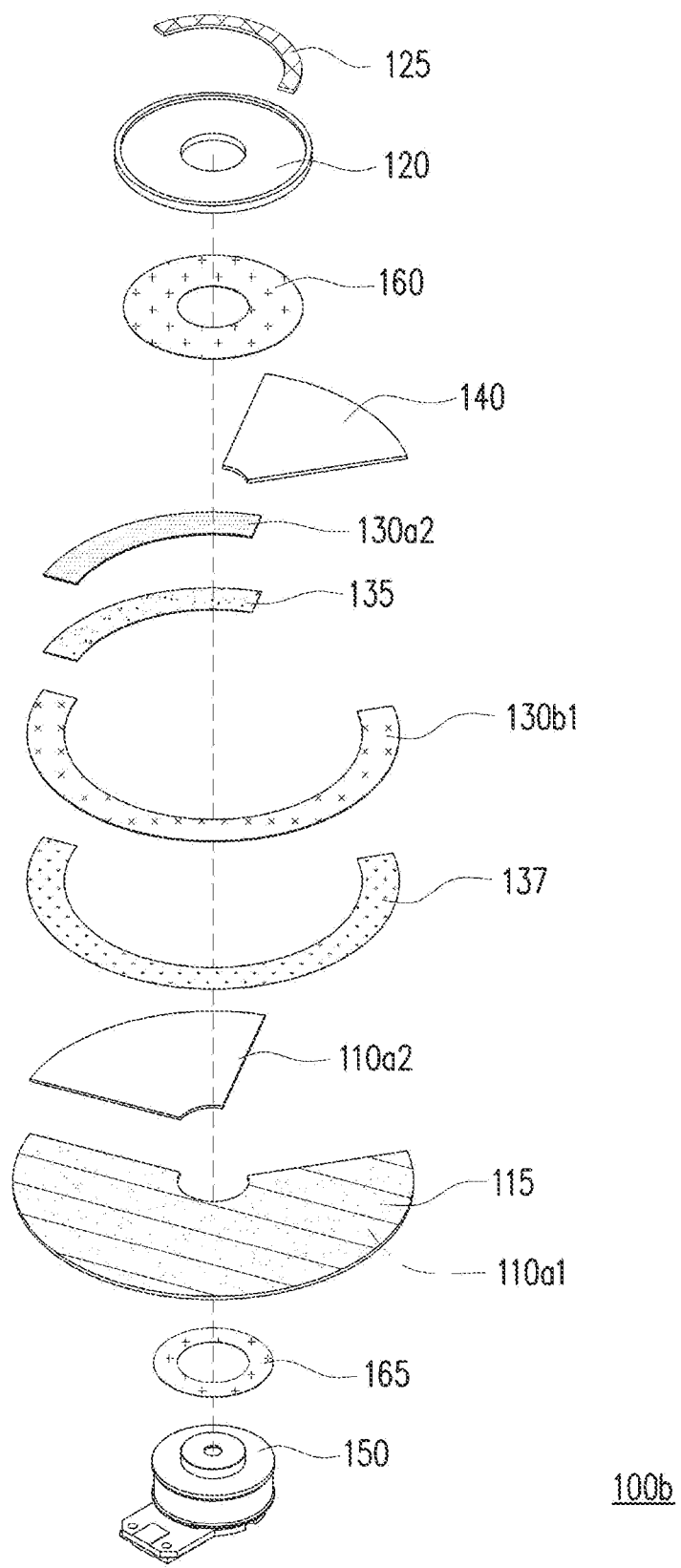
FIG. 3B is a three-dimensional exploded schematic diagram of the wavelength conversion module in FIG. 3A.
Figure 3C:
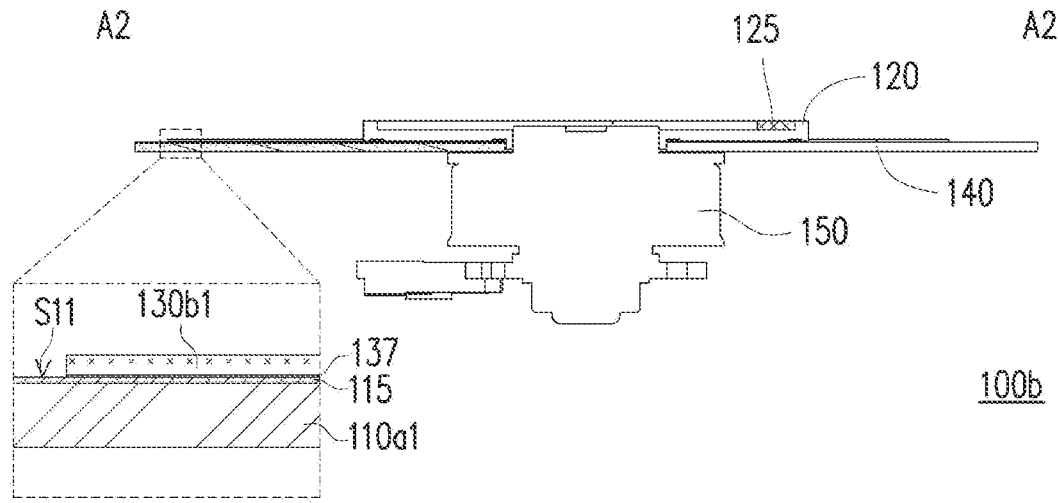
FIG. 3C is a schematic cross-sectional view along an axis A2-A2 in FIG. 3A.
Figure 3D:
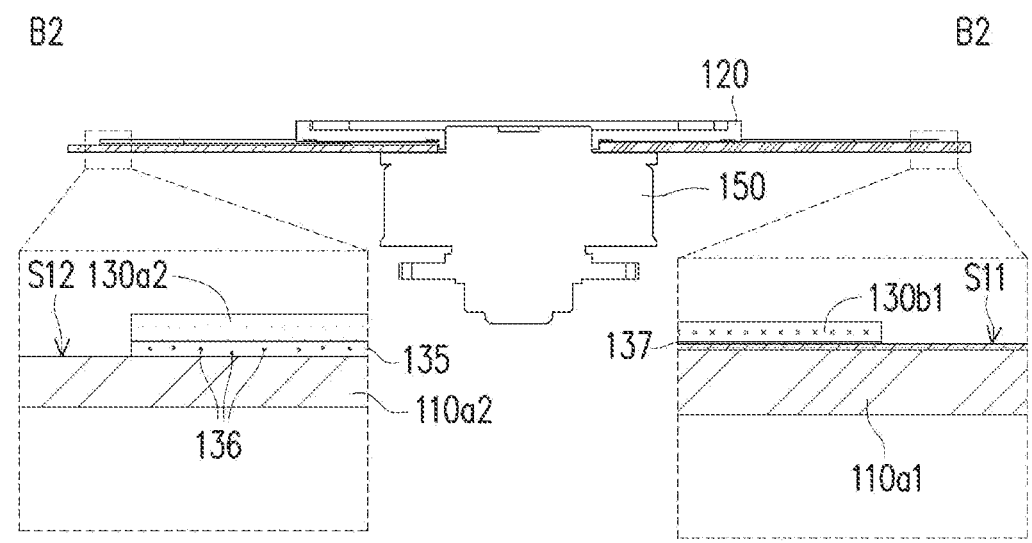
FIG. 3D is a schematic cross-sectional view along an axis B2-B2 in FIG. 3A.

FIG. 3A is a schematic top view of a wavelength conversion module according to an embodiment of the disclosure. FIG. 3B is a three-dimensional exploded schematic diagram of the wavelength conversion module in FIG. 3A. FIG. 3C is a schematic cross-sectional view along an axis A2-A2 in FIG. 3A. FIG. 3D is a schematic cross-sectional view along an axis B2-B2 in FIG. 3A. With reference to FIGS. 2A and 3A concurrently, a wavelength conversion module 100b of the embodiment is similar to the wavelength conversion module 100a in FIG. 2A, except a structure of a first wavelength conversion layer 130b1 of the embodiment is different from that of the first wavelength conversion layer 130a1.

In detail, with reference to FIGS. 3B to 3D concurrently, in the embodiment, the first wavelength conversion layer 130b1 is, for example, a phosphor ceramic, a polycrystalline phosphor, a monocrystalline phosphor, or a phosphor-in-glass (PiG), but is not limited thereto. Furthermore, the wavelength conversion module 100b of the embodiment further includes an adhesive layer 137 disposed between the first upper surface S11 (shown in FIG. 3C) of the first substrate 110a1 and the first wavelength conversion layer 130b1. The first wavelength conversion layer 130b1 is fixed on the first substrate 110a1 through the adhesive layer 137. Here, a refractive index of the adhesive layer 137 is between 1.4 and 1.6, and visible light transmittance of the adhesive layer 137 is greater than 90%. The adhesive layer 137 is, for example, a transparent silica gel, but is not limited thereto.

Figure 4A:
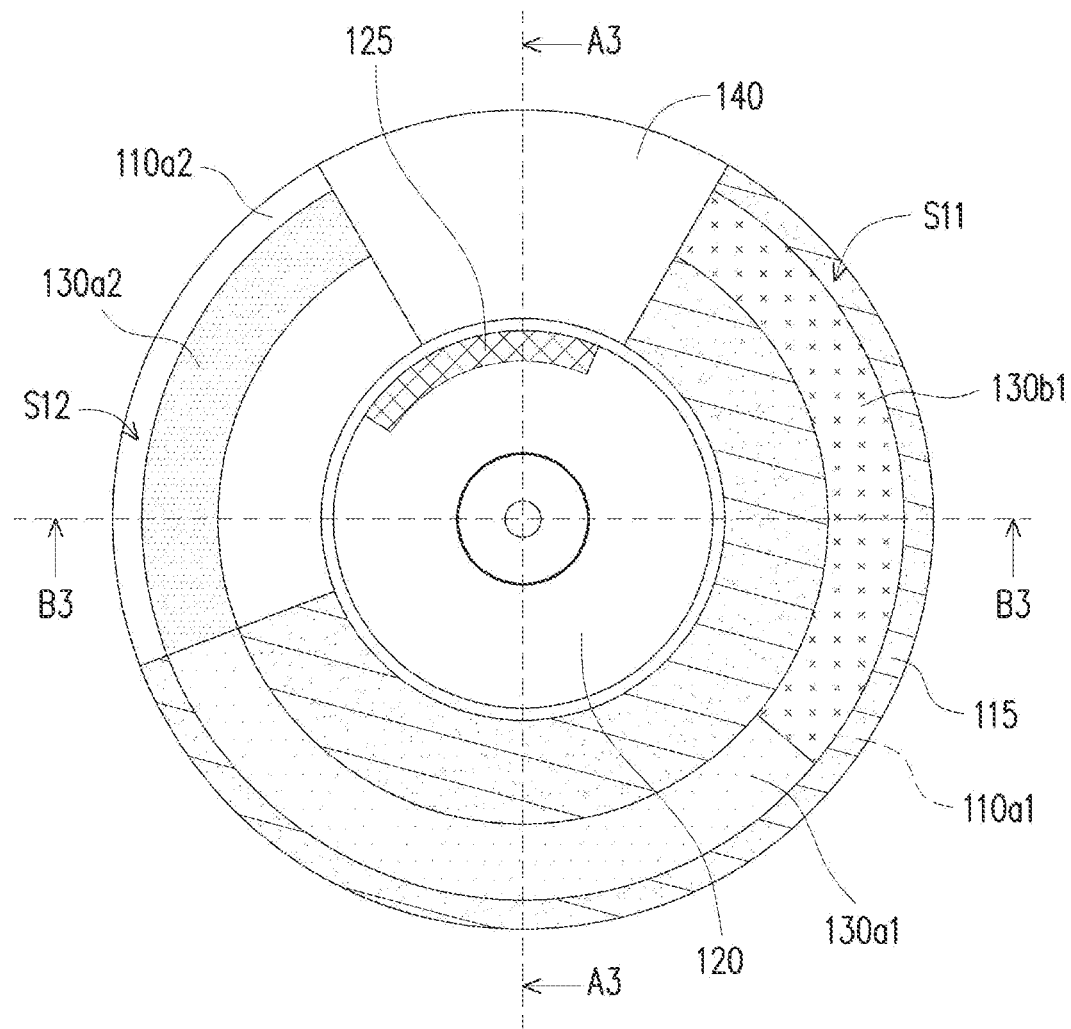
FIG. 4A is a schematic top view of a wavelength conversion module according to another embodiment of the disclosure.
Figure 4B:
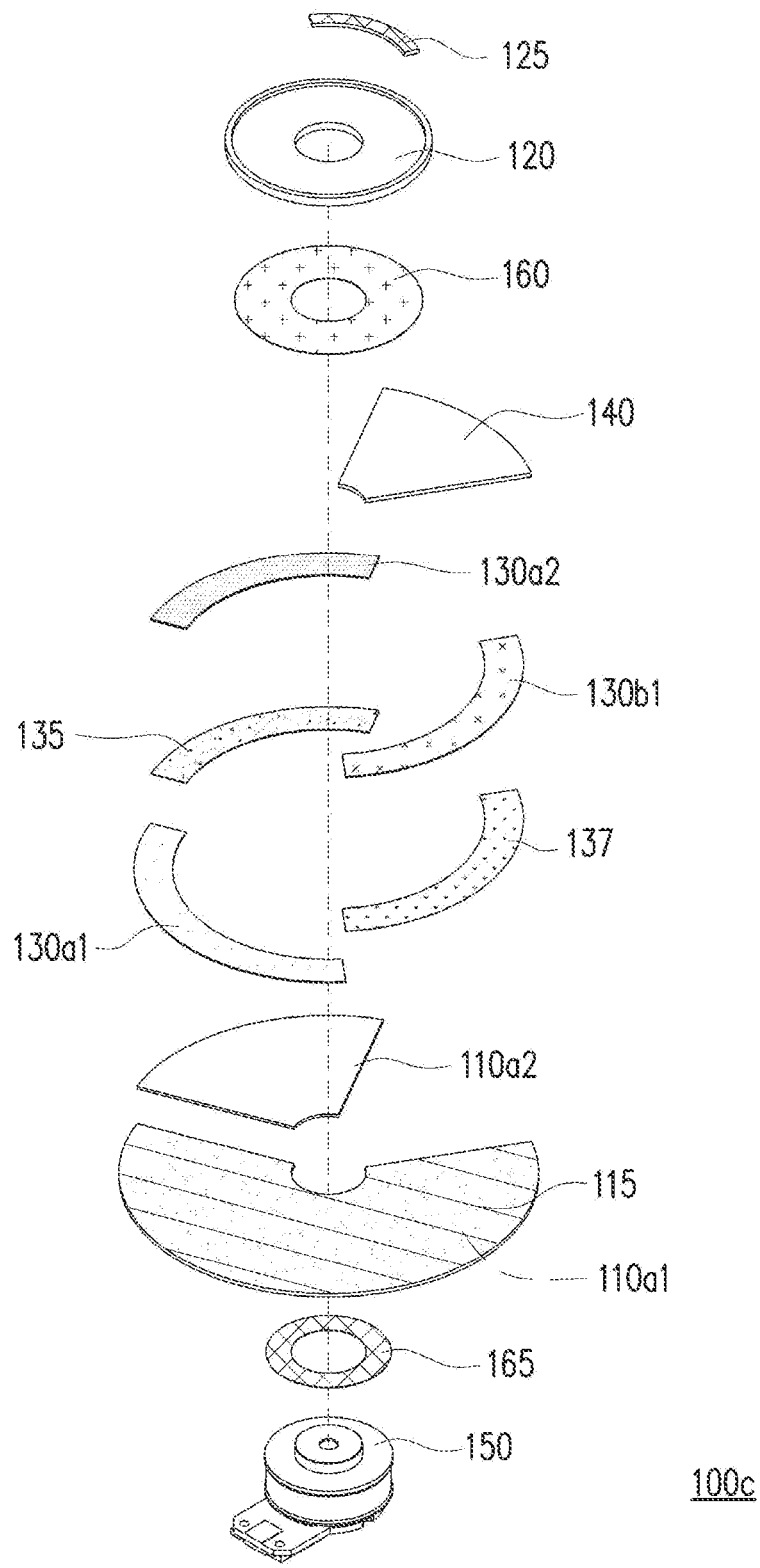
FIG. 4B is a three-dimensional exploded schematic view of the wavelength conversion module in FIG. 4A.
Figure 4C:
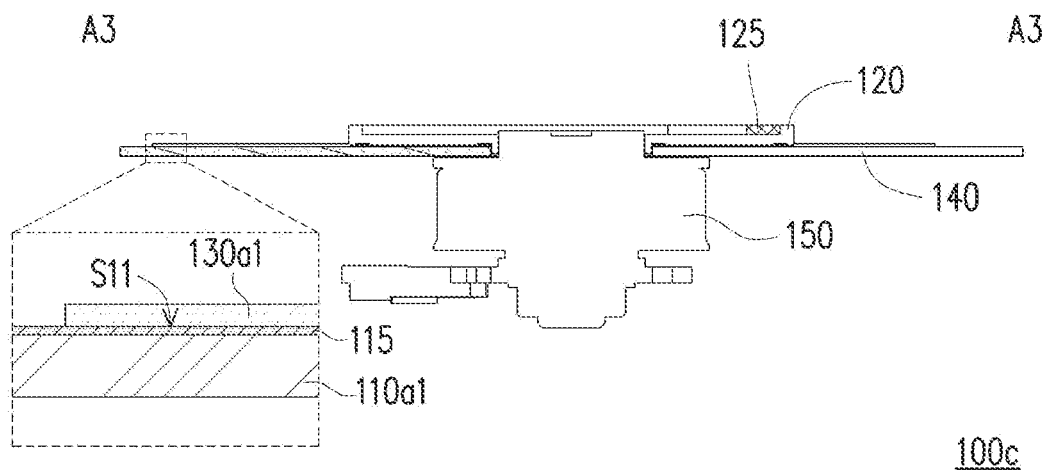
FIG. 4C is a schematic cross-sectional view along an axis A3-A3 in FIG. 4A.
Figure 4D:
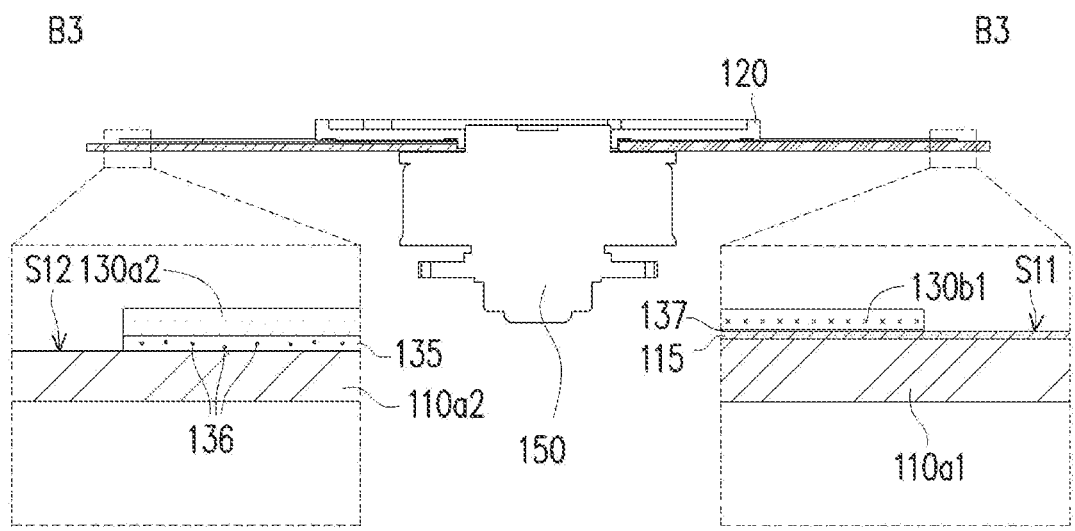
FIG. 4D is a schematic cross-sectional view along an axis B3-B3 in FIG. 4A.

FIG. 4A is a schematic top view of a wavelength conversion module according to another embodiment of the disclosure. FIG. 4B is a three-dimensional exploded schematic view of the wavelength conversion module in FIG. 4A. FIG. 4C is a schematic cross-sectional view along an axis A3-A3 in FIG. 4A. FIG. 4D is a schematic cross-sectional view along an axis B3-B3 in FIG. 4A. With reference to FIGS. 2A and 4A concurrently, a wavelength conversion module 100c of the embodiment is similar to the wavelength conversion module 100a in FIG. 2A, except that the wavelength conversion module 100c of the embodiment further includes the first wavelength conversion layer 130b1, which is directly disposed on the first surface S11 of the first substrate 110a1. Here, the structure of the first wavelength conversion layer 130b1 is different from that of the first wavelength conversion layer 130a1. A material of the first wavelength conversion layer 130a1 is phosphor particles mixed with an alcohol-soluble inorganic adhesive or an aqueous inorganic adhesive, and the first wavelength conversion layer 130b1 is, for example, a phosphor ceramic, a polycrystalline phosphor, a monocrystalline phosphor, or a phosphor-in-glass (PiG), but is not limited thereto.

In detail, with reference to FIGS. 4B, to 4D concurrently, in the embodiment, the first wavelength conversion layer 130a1 is directly disposed on the first substrate 110a1 that is plated with the coating layer 115, and the second wavelength conversion layer 130a2 is disposed on the second substrate 110a2 through the diffuse reflection layer 135. Furthermore, the wavelength conversion module 100c of the embodiment further includes the adhesive layer 137, which is disposed between the first upper surface S11 of the first substrate 110a1 and the first wavelength conversion layer 130b1. The first wavelength conversion layer 130b1 is fixed on the first substrate 110a1 through the adhesive layer 137. Here, the refractive index of the adhesive layer 137 is between 1.4 and 1.6, and the visible light transmittance of the adhesive layer 137 is greater than 90%. The adhesive layer 137 is, for example, a transparent silica gel, but is not limited thereto.

Figure 5A:
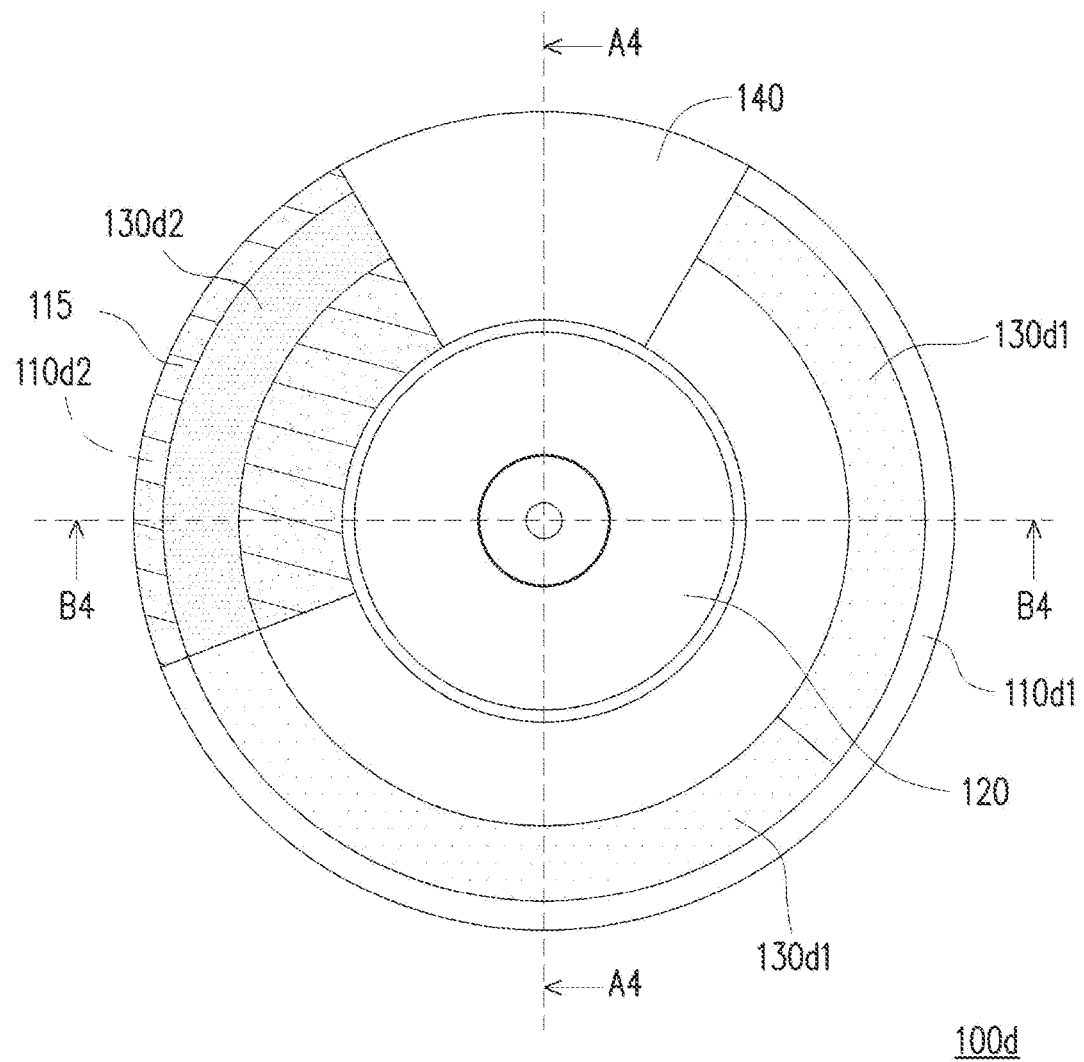
FIG. 5A is a schematic top view of a wavelength conversion module according to another embodiment of the disclosure.
Figure 5B:
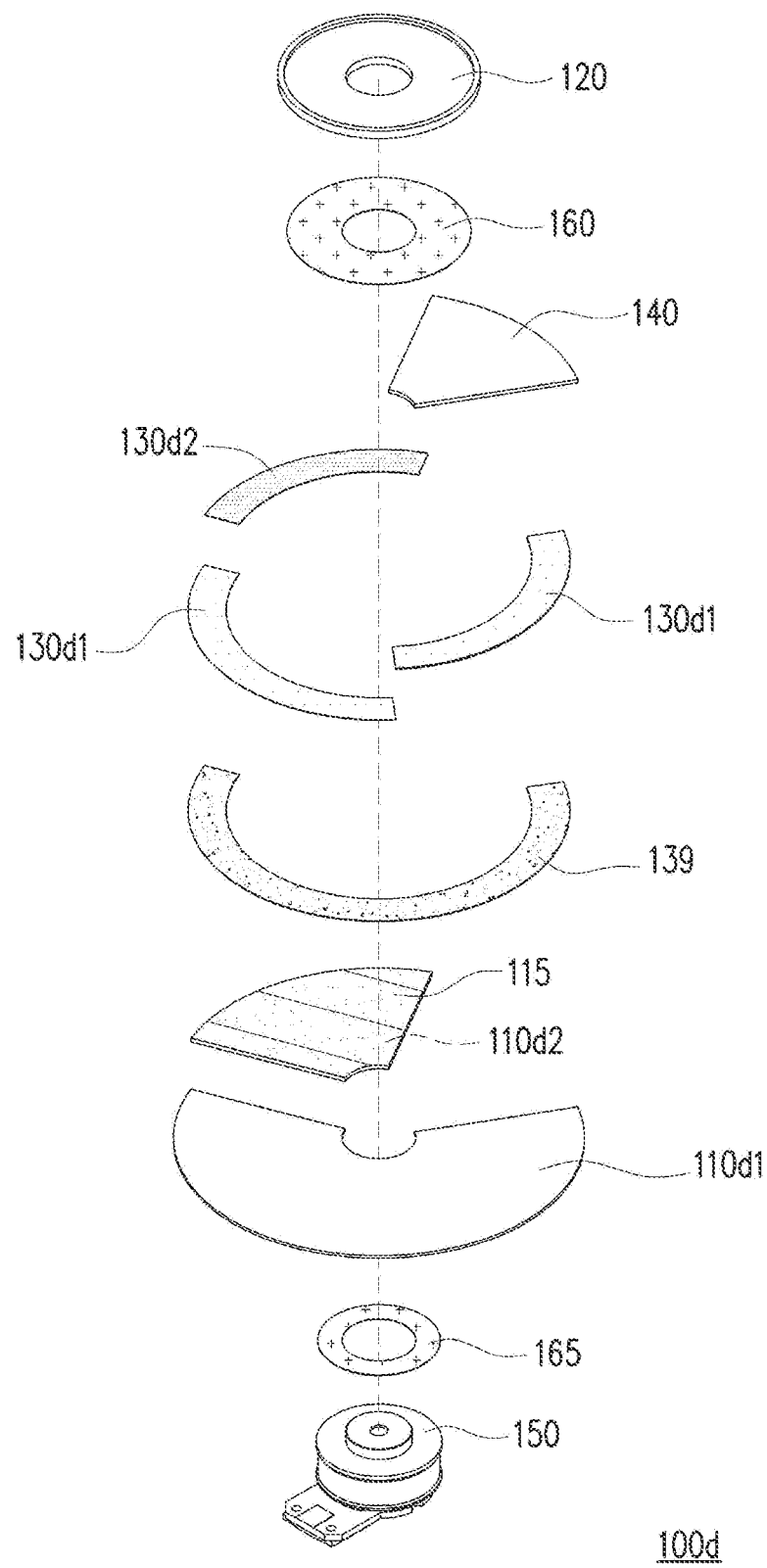
FIG. 5B is a three-dimensional exploded schematic view of the wavelength conversion module in FIG. 5A.
Figure 5C:
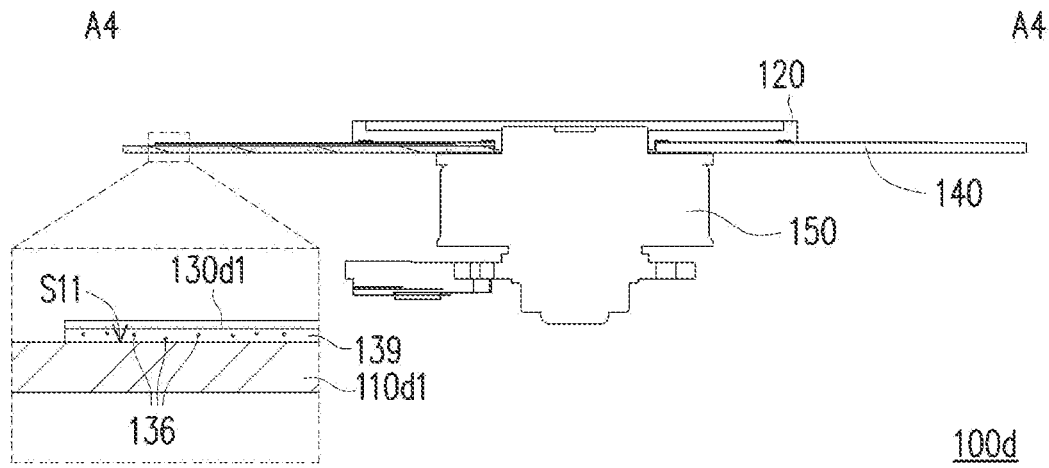
FIG. 5C is a schematic cross-sectional view along an axis A4-A4 in FIG. 5A.
Figure 5D:
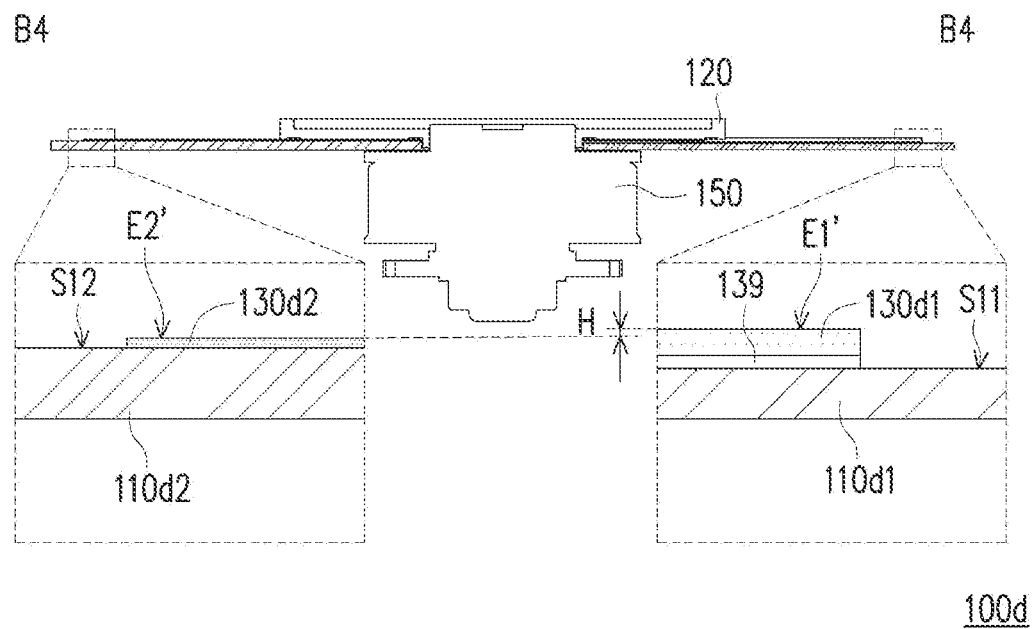
FIG. 5D is a schematic cross-sectional view along an axis B4-B4 in FIG. 5A.

FIG. 5A is a schematic top view of a wavelength conversion module according to another embodiment of the disclosure. FIG. 5B is a three-dimensional exploded schematic view of the wavelength conversion module in FIG. 5A. FIG. 5C is a schematic cross-sectional view along an axis A4-A4 in FIG. 5A. FIG. 5D is a schematic cross-sectional view along an axis B4-B4 in FIG. 5A. With reference to FIGS. 2A and 5A concurrently, a wavelength conversion module 100d of the embodiment is similar to the wavelength conversion module 100a in FIG. 2A except that in the embodiment, a first substrate 110d1 is embodied as a ceramic substrate, and a second substrate 110d2 is embodied as a metal substrate plated with a coating layer 115. In addition, the wavelength conversion module 100d of the embodiment includes two first wavelength conversion layers 130d1, which are connected to each other and disposed on the first substrate 110d1. Here, a material of the first wavelength conversion layer 130d1 is, for example, phosphor particles mixed with an alcohol-soluble inorganic adhesive or an aqueous inorganic adhesive.

Furthermore, with reference to FIGS. 5B to 5D, in the embodiment, the wavelength conversion module 100d further includes a diffuse reflection layer 139 disposed between a first surface S11 of the first substrate 110d1 and the first wavelength conversion layers 130d1. The first wavelength conversion layers 130d1 are disposed on the first substrate 110d1 through the diffuse reflection layer 139. The diffuse reflection layer 139 includes the multiple white scattering particles 136. The white scattering particles 136 are, for example, multiple titanium dioxide particles, multiple silica particles, multiple alumina particles, multiple boron nitride particles, or multiple zirconia particles. A second wavelength conversion layer 130d2 is directly disposed on the second substrate 110d2 that is plated with the coating layer 115. Here, there is a height difference H between a first light-emitting surface E1' of the first wavelength conversion layer 130d1 and a second light-emitting surface E2' of the second wavelength conversion layer 130d2. Since the wavelength conversion layers made by different manufacturing processes have different optimal distances to the light valve 30 (with reference to FIG. 1), the height difference H with the best luminous efficiency may be obtained by adjusting thicknesses of the first substrate 110d1, the second substrate 110d2, the diffuse reflection layer 139, the first wavelength conversion layer 130d1, and the second wavelength conversion layer 130d2.

Figure 6A:
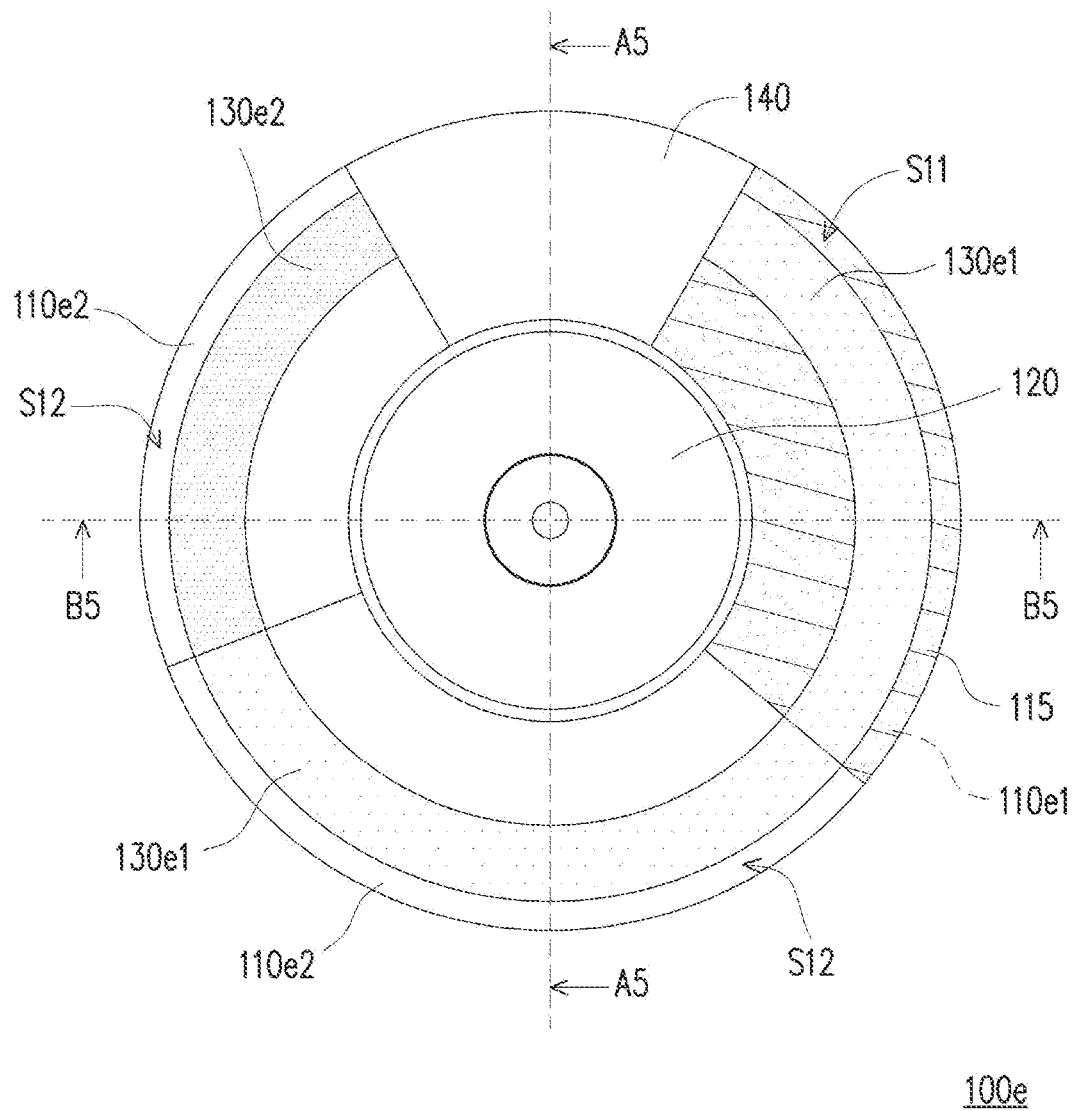
FIG. 6A is a schematic top view of a wavelength conversion module according to another embodiment of the disclosure.
Figure 6B:
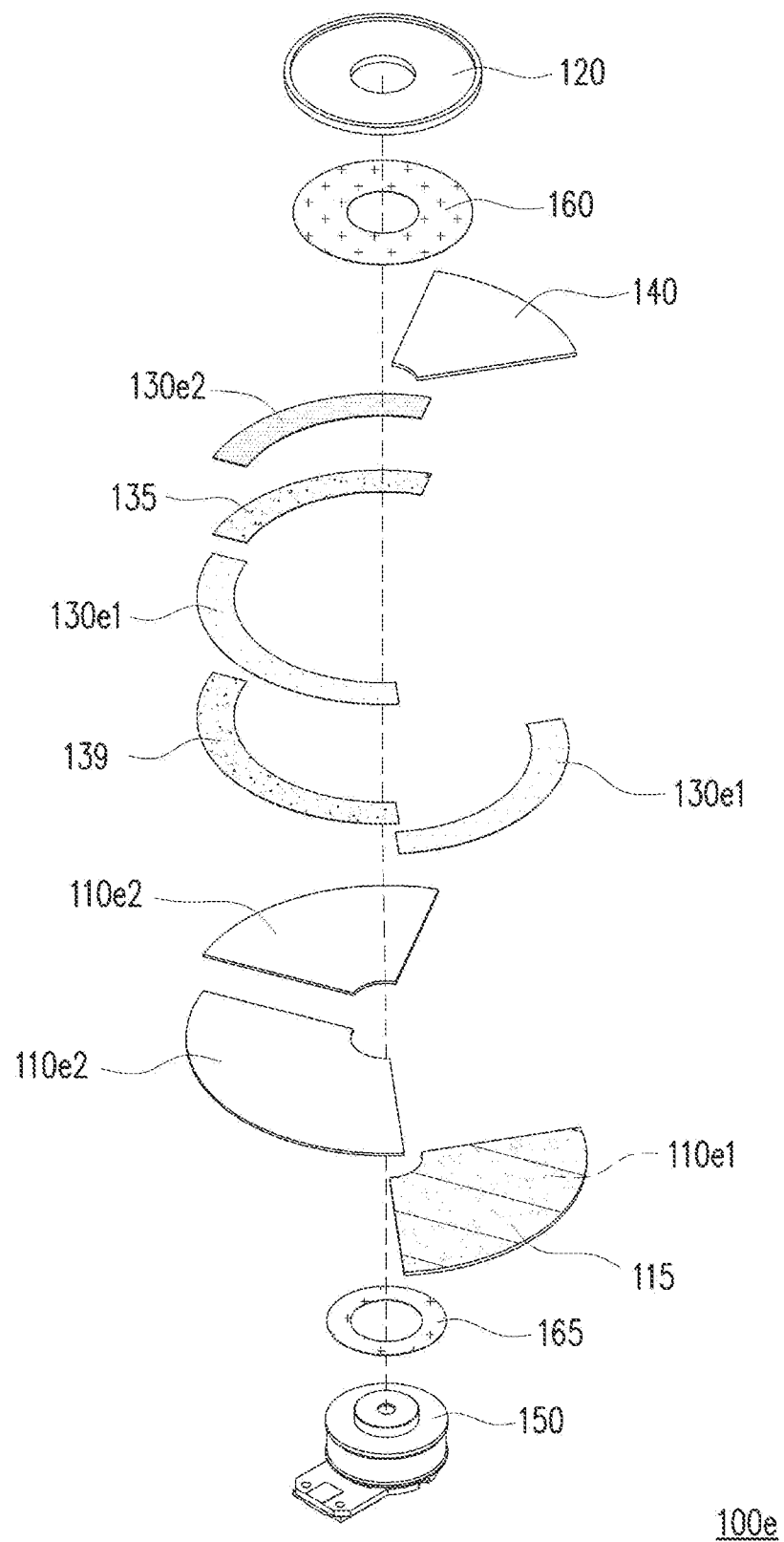
FIG. 6B is a three-dimensional exploded schematic view of the wavelength conversion module in FIG. 6A.
Figure 6C:
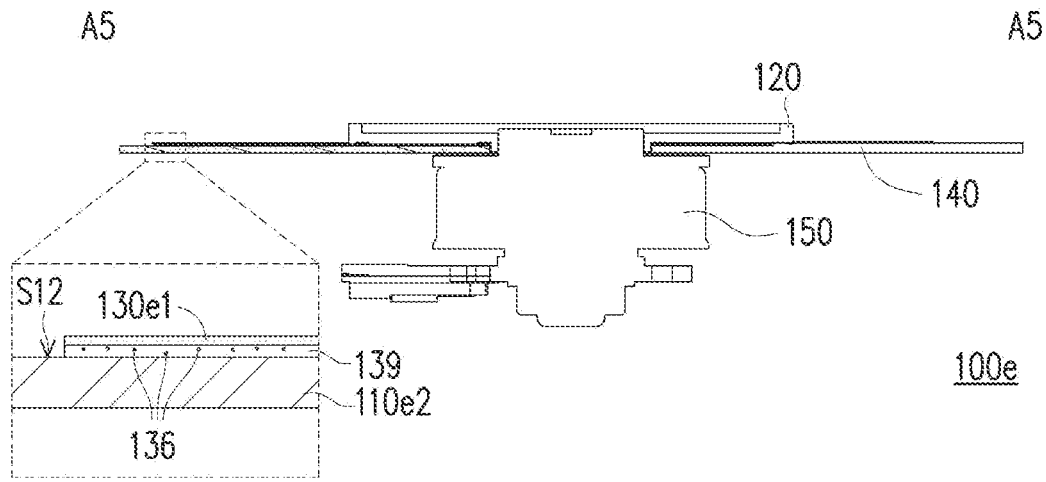
FIG. 6C is a schematic cross-sectional view along an axis A5-A5 in FIG. 6A.
Figure 6D:
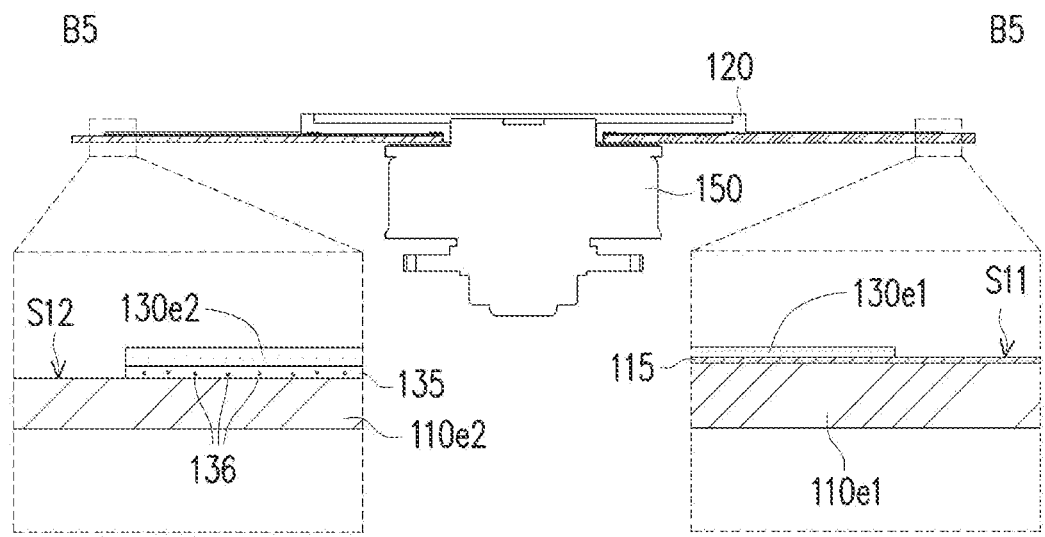
FIG. 6D is a schematic cross-sectional view along an axis B5-B5 in FIG. 6A.

FIG. 6A is a schematic top view of a wavelength conversion module according to another embodiment of the disclosure. FIG. 6B is a three-dimensional exploded schematic view of the wavelength conversion module in FIG. 6A. FIG. 6C is a schematic cross-sectional view along an axis A5-A5 in FIG. 6A. FIG. 6D is a schematic cross-sectional view along an axis B5-B5 in FIG. 6A. With reference to FIGS. 2A and 6A concurrently, a wavelength conversion module 100e of the embodiment is similar to the wavelength conversion module 100a in FIG. 2A, except that in the embodiment, the wavelength conversion module 100e includes two first wavelengths conversion layers 130e1, which are connected to each other and respectively disposed on a first substrate 110e1 and a second substrate 110e2. Here, the first substrate 110e1 is embodied as a metal substrate plated with a coating layer 115, and the second substrate 110e2 is embodied as a ceramic substrate.

In detail, with reference FIGS. 6B to 6D concurrently, in the embodiment, the first wavelength conversion layers 130e1 are directly disposed on the first substrate 110e1 that is plated with the coating layer 115. Furthermore, the wavelength conversion module 100e of the embodiment further includes the diffuse reflection layer 139, which is disposed between the second surface S12 of the second substrate 110e2 and the first wavelength conversion layers 130e1. The first wavelength conversion layers 130e1 are disposed on the second substrate 110e2 through the diffuse reflection layer 139. A second wavelength conversion layer 130e2 is disposed on the second substrate 110e2 through the diffuse reflection layer 135. The diffuse reflection layers 135, 139 include the multiple white scattering particles 136, the white scattering particles 136 are, for example, multiple titanium dioxide particles, multiple silica particles, multiple alumina particles, multiple boron nitride particles, or multiple zirconia particles, but is not limited thereto.

It is worth mentioning that in other unillustrated embodiments, in the configuration of the long-wavelength first wavelength conversion layer, for example, the first wavelength conversion layer may be phosphor particles mixed with an alcohol-soluble inorganic adhesive or an aqueous inorganic adhesive. Alternatively, for example, the first wavelength conversion layer is in the form of a phosphor ceramic, a polycrystalline phosphor, a monocrystalline phosphor, or a phosphor-in-glass (PiG), and disposed on the ceramic substrate plated with a coating layer. In the configuration of the short-wavelength second wavelength conversion layer, for example, the second wavelength conversion layer in the form of a phosphor ceramic, a polycrystalline phosphor, a monocrystalline phosphor, or a phosphor-in-glass (PiG), and disposed on a metal substrate plated with a coating layer through an adhesive layer. Alternatively, the second wavelength conversion layer may be phosphor particles mixed with an alcohol-soluble inorganic adhesive or an aqueous inorganic adhesive, and disposed on a ceramic substrate plated with the coating layer. Alternatively, the second wavelength conversion layer, in the form of a phosphor ceramic, a polycrystalline phosphor, a monocrystalline phosphor, or a phosphor-in-glass (PiG), and disposed on a ceramic substrate plated with a coating layer through an adhesive layer. Therefore, the brightness can be optimally adjusted through different substrate thickness, diffuse reflection layer thickness, and wavelength conversion layer thickness. Therefore, surfaces of the different wavelength conversion layers may be the same height or different heights, and the above-mentioned embodiments all fall within the scope of protection of the disclosure.

In summary, the embodiments of the disclosure have at least one of the following advantages. In the design of the wavelength conversion module of the disclosure, the first substrate and the second substrate are connected together by the counterweight ring. The first wavelength conversion layer that emits the first excited beam is disposed on the first substrate and the first excited beam does not penetrate the first substrate, while the second wavelength conversion layer that emits the second excited beam is disposed on the second substrate and the second received beam does not penetrate the second substrate. Compared with the related art, the wavelength conversion module of the disclosure does not has to be fixed through a metal bottom plate, which can effectively reduce the number of layers and weight, thereby having the advantages of good heat dissipation, light weight, simple manufacturing process, and low cost.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby enabling persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the terms "the invention", "the present disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the disclosure as defined by the following claims. Moreover, no element and assembly in the disclosure is intended to be dedicated to the public regardless of whether the element or assembly is explicitly recited in the following claims.

What is claimed is:

1. A wavelength conversion module, comprising:
    a first substrate, having a first upper surface;
    a second substrate, having a second upper surface;
    a counterweight ring, disposed on the first upper surface of the first substrate and the second upper surface of the second substrate, so as to connect the first substrate to the second substrate;
    a first wavelength conversion layer, disposed on the first upper surface of the first substrate and located around the counterweight ring; and
    a second wavelength conversion layer, disposed on the second upper surface of the second substrate and located around the counterweight ring,
    wherein a wavelength of a first excited beam emitted by the first wavelength conversion layer is greater than a wavelength of a second excited beam emitted by the second wavelength conversion layer, wherein the first excited beam does not penetrate the first substrate, and the second excited beam does not penetrate the second substrate, wherein a thermal conductivity of the first substrate and a thermal conductivity of the second substrate are both greater than 100 W/mK, and the thermal conductivity of the first substrate is greater than the thermal conductivity of the second substrate.

2. The wavelength conversion module according to claim 1, wherein a thickness of the first substrate is greater than or equal to a thickness of the second substrate.

3. The wavelength conversion module according to claim 1, wherein the first substrate is a metal substrate, and the second substrate is a ceramic substrate.

4. The wavelength conversion module according to claim 3, wherein the first substrate has a coating layer, and the coating layer comprises one of a silver-plated reflection layer, an aluminum-plated reflection layer and a dielectric-plated reflection layer.

5. The wavelength conversion module according to claim 1, further comprising:
    a diffuse reflection layer, wherein the diffuse reflection layer is disposed between the second surface of the second substrate and the second wavelength conversion layer.

6. The wavelength conversion module according to claim 5, wherein the diffuse reflection layer comprises a plurality of white scattering particles, and the plurality of white scattering particles comprises one of a plurality of titanium dioxide particles, a plurality of silica particles, a plurality of alumina particles, a plurality of boron nitride particles and a plurality of zirconia particles.

7. The wavelength conversion module according to claim 5, wherein the diffuse reflection layer has a thickness, the thickness is between 0.08 nm to 0.2 mm.

8. The wavelength conversion module according to claim 1, further comprising:
    a driving assembly, wherein the first substrate has a first lower surface opposite to the first upper surface, the second substrate has a second lower surface opposite to the second upper surface, and the driving assembly is disposed on the first lower surface of the first substrate and the second lower surface of the second substrate, so as to clamp the first substrate to the second substrate by the counterweight ring.

9. The wavelength conversion module according to claim 8, further comprising:
    a first adhesive layer, disposed between the counterweight ring and the first substrate and the second substrate, wherein the counterweight ring is fixed on the first upper surface of the first substrate and the second upper surface of the second substrate through the first adhesive layer; and
    a second adhesive layer, disposed between the driving assembly and the first substrate and the second substrate, wherein the driving assembly is fixed on the first lower surface of the first substrate and the second lower surface of the second substrate through the second adhesive layer.

10. The wavelength conversion module according to claim 1, further comprising:

a light-transmitting plate, joined with the first substrate and the second substrate to form a circular turntable, and is connected to the first substrate and the second substrate through the counterweight ring.

11. The wavelength conversion module according to claim 1, wherein the first wavelength conversion layer comprises one of a phosphor ceramic, a polycrystalline phosphor, a monocrystalline phosphor and a phosphor-in-glass.

12. The wavelength conversion module according to claim 11, further comprising:
an adhesive layer, disposed between the first upper surface of the first substrate and the first wavelength conversion layer, wherein the first wavelength conversion layer is fixed on the first substrate through the adhesive layer.

13. The wavelength conversion module according to claim 12, wherein a refractive index of the adhesive layer is between 1.4 and 1.6, and visible light transmittance of the adhesive layer is greater than 90%.

14. The wavelength conversion module according to claim 1, wherein a center wavelength of the first excited beam is between 541 nm and 620 nm, and a center wavelength of the second excited beam is between 500 nm and 540 nm.

15. The wavelength conversion module according to claim 1, wherein a thickness of the first wavelength conversion layer and a thickness of the second wavelength conversion layer all are between 0.08 mm and 0.30 mm.

16. The wavelength conversion module according to claim 1, wherein a first light-emitting surface of the first wavelength conversion layer and a second light-emitting surface of the second wavelength conversion layer are located on a same plane.

17. The wavelength conversion module according to claim 1, wherein there is a height difference between a first light-emitting surface of the first wavelength conversion layer and a second light-emitting surface of the second wavelength conversion layer.

18. A projection device, comprising:
an illumination module, configured to provide an illumination beam, and comprising:
a light source, configured to provide an excitation beam; and
a wavelength conversion module, disposed on a transmission path of the excitation beam, and configured to convert the excitation beam into a converted beam, wherein the illumination beam comprises the converted beam, the wavelength conversion module comprising:
a first substrate, having a first upper surface;
a second substrate, having a second upper surface;
a counterweight ring, disposed on the first upper surface of the first substrate and the second upper surface of the second substrate, so as to connect the first substrate to the second substrate;
a first wavelength conversion layer, disposed on the first upper surface of the first substrate and located around the counterweight ring; and
a second wavelength conversion layer, disposed on the second upper surface of the second substrate and located around the counterweight ring,
wherein a wavelength of a first excited beam emitted by the first wavelength conversion layer is greater than a wavelength of a second excited beam emitted by the second wavelength conversion layer, wherein the first excited beam does not penetrate the first substrate, and the second excited beam does not penetrate the second substrate, wherein a thermal conductivity of the first substrate and a thermal conductivity of the second substrate are both greater than 100 W/mK, and the thermal conductivity of the first substrate is greater than the thermal conductivity of the second substrate;
a light valve, disposed on a transmission path of the illumination beam, and configured to convert the illumination beam into an image beam; and
a projection lens, disposed on a transmission path of the image beam, and configured to project the image beam out of the projection device.

* * * * *